US006290463B1

(12) United States Patent
Fargher et al.

(10) Patent No.: US 6,290,463 B1
(45) Date of Patent: Sep. 18, 2001

(54) SLOTTED IMPINGEMENT COOLING OF AIRFOIL LEADING EDGE

(75) Inventors: David G. W. Fargher, Fairfield; Ching-Pang Lee, Cincinnati, both of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/410,241

(22) Filed: Sep. 30, 1999

(51) Int. Cl.[7] .................................. F01D 5/18; F01D 9/04
(52) U.S. Cl. ............................................. 416/97 R; 415/115
(58) Field of Search ............................. 416/96 R, 96 A, 416/97 R; 415/115

(56) References Cited

U.S. PATENT DOCUMENTS

| | | | |
|---|---|---|---|
| 3,045,965 | * 7/1962 | Bowmer | 416/97 R |
| 3,623,825 | * 11/1971 | Schneider | 416/97 R |
| 3,781,129 | 12/1973 | Aspinwall . | |
| 3,921,271 | * 11/1975 | Dennis et al. | 416/97 R |
| 4,105,364 | 8/1978 | Dodd . | |
| 4,314,794 | 2/1982 | Holden et al. . | |
| 4,505,639 | 3/1985 | Groess et al. . | |
| 5,269,653 | * 12/1993 | Evans | 416/97 R |
| 5,591,007 | 1/1997 | Lee et al. . | |
| 5,603,606 | * 2/1997 | Glezer et al. | 416/97 R |
| 5,902,093 | 5/1999 | Liotta et al. . | |

FOREIGN PATENT DOCUMENTS

| | | | |
|---|---|---|---|
| 960071 | * 6/1964 | (GB) | 416/97 R |
| 1033759 | * 6/1966 | (GB) | 416/97 R |

\* cited by examiner

Primary Examiner—Christopher Verdier
(74) Attorney, Agent, or Firm—Andrew C. Hess; Rodney M. Young

(57) ABSTRACT

A coolable gas turbine engine airfoil for a gas turbine engine suitable for a blade or vane includes an outer airfoil wall with pressure and suction sides extending chordwise between leading and trailing edges of the airfoil, a leading edge cooling plenum formed between a forward most span rib and the outer wall along the leading edge of the airfoil, and a cooling air channel within the airfoil bounded in part by the forward most rib. A slotted cooling air impingement element is disposed in the span rib for impinging cooling air from the channel on an interior surface of the outer airfoil wall along the leading edge of the airfoil. One embodiment of the slotted cooling air impingement element is a single longitudinally extending slot extending along almost an entire length of the forward most rib and the longitudinally slot preferably includes longitudinally spaced apart rounded ends. In another embodiment of the airfoil, the slotted cooling air impingement element is includes two or more closely spaced apart longitudinally extending slots extending along almost an entire length of the forward most rib and each of the longitudinally extending slots preferably has longitudinally spaced apart rounded ends

11 Claims, 5 Drawing Sheets

SLOTTED IMPINGEMENT COOLING OF AIRFOIL LEADING EDGE

FIELD OF THE INVENTION

The present invention relates generally to cooling of turbine rotor blades and stator vanes in gas turbine engine turbines and, more specifically, to impingement cooling of leading edges of airfoils in turbine rotor blades and stator vanes.

DESCRIPTION OF RELATED ART

A gas turbine engine includes a compressor that compresses air which is channeled to a combustor wherein it is mixed with fuel and ignited for generating combustion gases. The combustion gases flow downstream through one or more stages of turbines which extract energy therefrom for powering the compressor and producing additional output power for driving a fan for powering an aircraft in flight for example. A turbine stage includes a row of turbine rotor blades secured to the outer perimeter of a rotor disk, with a stationary turbine nozzle, having a plurality of stator vanes disposed upstream therefrom. The combustion gases flow between the stator vanes and between the turbine blades for extracting energy to rotate the rotor disk. Since the combustion gases are hot, the turbine vanes and blades are typically cooled with a portion of compressor air bled from the compressor for this purpose. Diverting any portion of the compressor air from use in the combustor necessarily decreases the overall efficiency of the engine. It is highly desirable to cool the vanes and blades with as little compressor bleed air as possible.

Typical turbine vanes and blades include an airfoil over which the combustion gases flow. The airfoil typically includes one or more serpentine cooling passages or other types of cooling circuits therein through which the compressor bleed air is channeled for cooling the airfoil. The airfoil may include various turbulators therein for enhancing cooling effectiveness, and the cooling air is discharged from the passages through various film cooling holes disposed around the outer surface of the airfoil.

High pressure turbine blades typically have very high heat loads at the leading edges. In order to cool this leading edge, an impingement cooling technique is often used in the first stage high pressure turbine blade. The impingement cooling is accomplished by directing the cooling air through a row of crossover holes in a wall between a leading edge cavity and a cavity or passage of the cooling circuit. The cooling air is then discharged through shower head holes in the leading edge to provide film cooling on an exterior surface of the leading edge of the airfoil.

Prior art crossover hole configurations are typically circular, ellipse, or race track in cross-section. The crossover holes are typically cast with the entire blade. During a casting process, a parting line between two core die halves is located where a middle of the crossover holes is located to allow the core die halves to be pulled apart in both concave and convex directions. A shift in the core die will result in a mismatch in crossover hole portion of the two halves because the parting line is located where the middle of the crossover holes are to be located. This then requires hand rework on the ceramic core or scrapping of the core. Rework contributes to variations in hole sizes which in turn results in flow variations. Natural core die wear also results in excess core material on the crossover holes requiring additional hand work of cores and increasing the chance of flow variation. Discrete impinging jets through the crossover holes result in local cool spots at the stagnation point of each jet.

Heat transfer coefficients on surfaces between jet stagnation points are less than the heat transfer coefficients at the stagnation points which causes undesirable non-uniform heat transfer distribution. Crossover hole misalignment leads to an even more undesirable and more non-uniform heat transfer distribution. Another problem common to the crossover holes is cracks around the edge of the crossover holes due to the stress concentration created by the discrete holes and the large thermal gradient between blade airfoil surface temperature and the wall in which the crossover holes are formed. Therefore, it is desirable to have an impingement design that requires less or no rework on the impingement holes and/or the core portions for the holes. It is also desirable to have an impingement design with improved heat transfer coefficient distribution and that reduces thermal stress on the wall in which the holes are formed.

SUMMARY OF THE INVENTION

A coolable gas turbine engine airfoil includes an outer airfoil wall with pressure and suction sides extending chordwise between leading and trailing edges of the airfoil, a leading edge cooling plenum formed between a forwardmost span rib and the outer wall along the leading edge of the airfoil, and a cooling air channel within the airfoil bounded in part by the forward most rib. A narrow slotted cooling air impingement means disposed in the span rib for impinging cooling air from the channel on an interior surface of the outer airfoil wall along the leading edge of the airfoil. The narrow slotted cooling air impingement means includes at least one longitudinally extending narrow slot having a slot length that is at least about an order of magnitude larger than a slot width of the narrow slot and the slot width is constant along the slot length. One embodiment of the slotted cooling air impingement means is a single longitudinally extending slot extending along almost an entire length of the forwardmost rib and the longitudinally slot preferably includes longitudinally spaced apart rounded ends. In another embodiment of the airfoil, the slotted cooling air impingement means includes two or more closely spaced apart longitudinally extending slots extending along almost an entire length of the forwardmost rib and each of the longitudinally extending slots preferably has longitudinally spaced apart rounded ends. Yet another embodiment of the invention provides a coolable gas turbine engine blade having the coolable airfoil extending longitudinally outwardly from a platform of the blade to an outer airfoil tip and a root extending longitudinally inwardly from the platform.

Since the number of slots is much less than the number of crossover holes that are typically used, the mismatched area caused by the shift between two core dies used during manufacture of the airfoils is minimized and the need for rework is greatly reduced. Excess core material at parting lines along centers of the crossover holes due to die wear is also reduced by the present invention. This helps reduce variation in impingement flow. The present invention produces a line jet through the slots which in turn results in a more uniform heat transfer distribution in the radial direction as opposed to point jets through the conventional discrete crossover holes. The line jet will also reduce the cross flow effects which exist in the discrete jets. The invention reduces stress created by the thermal gradient between the outer surface and the slot wall because the slot design provides a separation between the slot walls. The impingement slots are more advantageous than crossover holes from a manufacturing standpoint and heat transfer performance and thermal stress standpoint.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
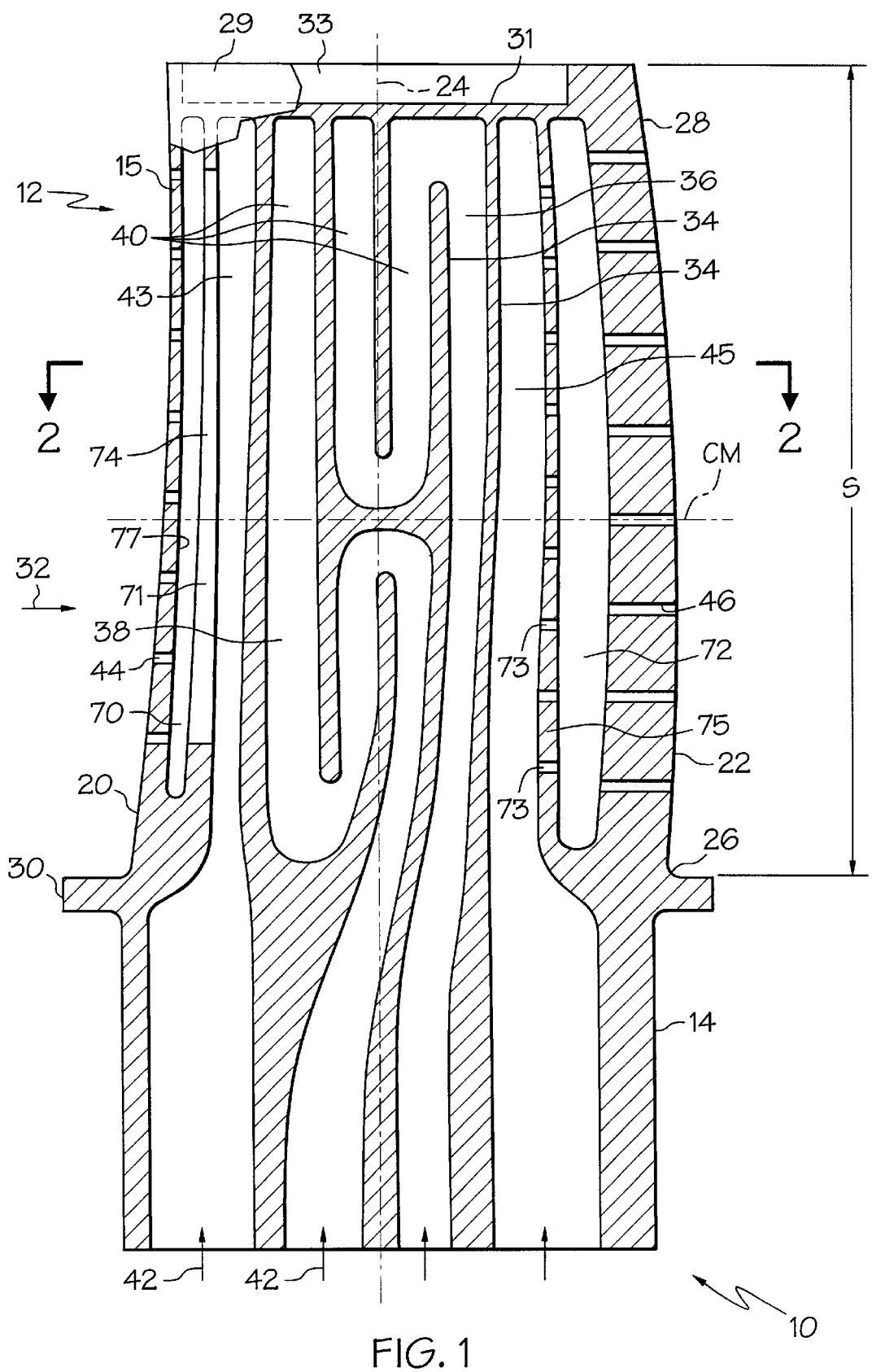
FIG. 1 is a sectional view illustration of an exemplary gas turbine engine turbine blade having a coolable airfoil including slotted impingement cooling of a leading edge of the airfoil.
Figure 2:
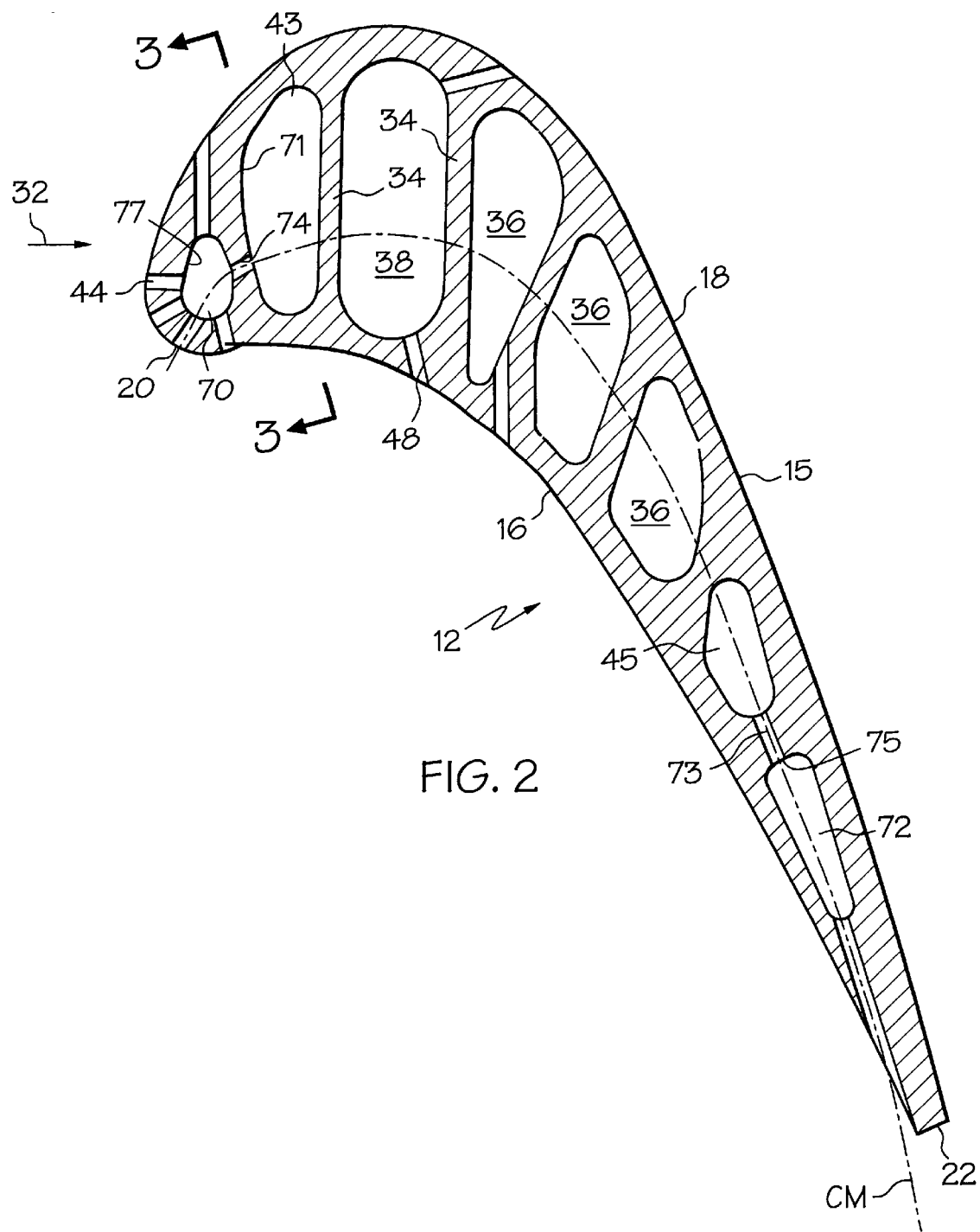
FIG. 2 is a sectional view illustration through the airfoil of the blade illustrated in FIG. 1 and taken along line 2—2.

Illustrated in FIG. 1 is an exemplary turbine blade 10 for a gas turbine engine. The blade 10 includes an airfoil 12 and a conventional dovetail root 14 which is used to conventionally secure the blade 10 to a rotor disk of the engine. A cross-section of the airfoil 12 is illustrated in FIG. 2 and shows that the airfoil 12 includes an outer wall 15 with a pressure side 16 and a suction side 18 joined together along an upstream leading edge 20 and a downstream trailing edge 22 which is spaced axially or chordally therefrom. The airfoil 12 extends longitudinally along a longitudinal or radial axis 24 in a spanwise direction of the airfoil 12 from a radially inner base 26 to a radially outer airfoil tip 28 along a span S of the airfoil. The airfoil tip 28 is illustrated as a squealer tip having an outward extension from outer wall 15 or a squealer tip wall 29 extending longitudinally outward from and peripherally around an outer tip wall 31 forming a squealer tip cavity 33 therein. The inner base 26 is defined at a conventional platform 30 which forms the inner flow boundary of the airfoil 12 and below which extends the root 14.

During operation of the blade 10, combustion gases are generated by a combustor (not shown) and flow in a downstream direction 32 over both airfoil pressure and suction sides 16 and 18, respectively, of the outer wall 15 and thus cooling of the airfoil 12 is provided. Although an exemplary gas turbine rotor blade 10 is illustrated in the FIGS., the invention applies equally as well to turbine stator vanes having similar airfoils which may be similarly cooled in accordance with the present invention.

The pressure and suction sides 16, 18 are spaced circumferentially or laterally apart from each other between the leading and trailing edges 20, 22 and are integrally joined together by a plurality of internal ribs indicated generally at 34 which define outer and inner tier serpentine cooling circuits 36 and 38, respectively, which are disposed generally above and below the midspan chord CM, respectively. The internal ribs 34 define a plurality of discrete serpentine channels 40 which extend longitudinally inside the airfoil 12 for channeling cooling air 42 conventionally received from a compressor (not shown) inside the airfoil 12 for the cooling thereof. In the exemplary embodiment illustrated in the FIGS., the outer and inner tier cooling circuits 36 and 38 are three-pass serpentine circuits. The outer and inner tier cooling circuits 36 and 38 may have any suitable number of serpentine passes as desired.

Figure 3:
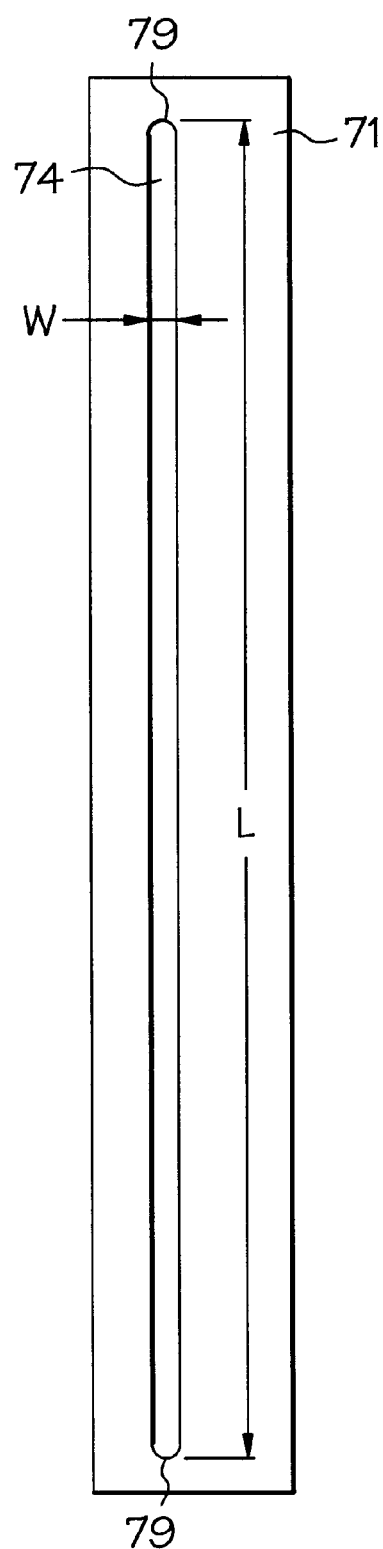
FIG. 3 is a sectional view through the airfoil of the blade illustrated in FIG. 2 illustrating an impingement cooling slot for the slotted impingement cooling and taken along line 3—3.

A leading edge cooling plenum 70 is formed between a forwardmost span rib or cold wall 71 and the leading edge 20 of the outer wall 15. A trailing edge cooling plenum 72 is formed between an aftwardmost span rib 75 and the trailing edge 22 of the outer wall 15. The present invention provides a narrow slotted cooling air impingement means illustrated as a single longitudinally extending slot 74 in the cold wall 71 in FIGS. 1 and 3 which feeds cooling air from a forward inlet channel 43 to the leading edge cooling plenum 70 and impinges the cooling air on a forward interior surface 77 of the leading edge 20 for impingement cooling of the leading edge. The narrow slotted cooling air impingement means includes at least one longitudinally extending narrow slot 74 having a slot length L that is at least about an order of magnitude larger than a slot width W of the narrow slot and the slot width being constant along the slot length. After the cooling air has been used for impingement cooling of the leading edge 20, it is flowed through conventional leading edge shower head cooling holes 44 to provide exterior film cooling of the leading edge 20.

Figure 4:
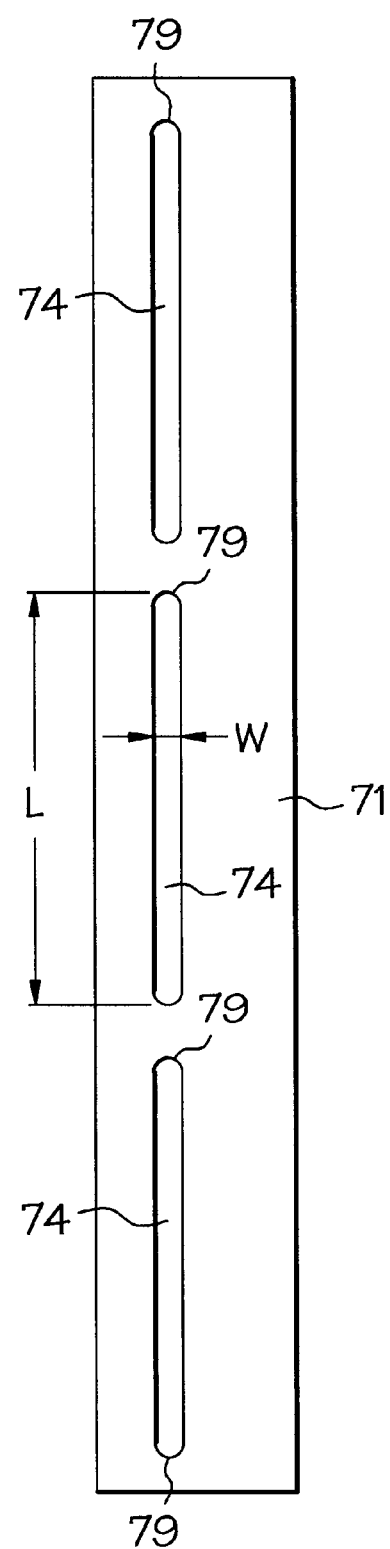
FIG. 4 is a sectional view through the airfoil of the blade illustrated in FIG. 2 illustrating an alternative technique for the slotted impingement cooling using slot a plurality of impingement cooling slots and taken along line 3—3.

FIG. 4 illustrates an alternative embodiment of the present invention having multiple slots 74 such as the three slots 74 shown. Each longitudinally extending slot 74 in the cold wall 71 in FIGS. 3 and 4 has rounded slot ends 79. Two or more slots 74 may be used.

Apertures 73 in the aftwardmost span rib 75 feed cooling air from an aft inlet channel 45 to the trailing edge cooling plenum 72 from where it is flowed through conventional trailing edge cooling holes 46 to cool the trailing edge 22. The airfoil includes film cooling holes 48 along one or both sides of the outer wall 15 as illustrated in FIG. 2. The film cooling holes 48 preferably are angled downstream in the outer wall.

Figure 5:
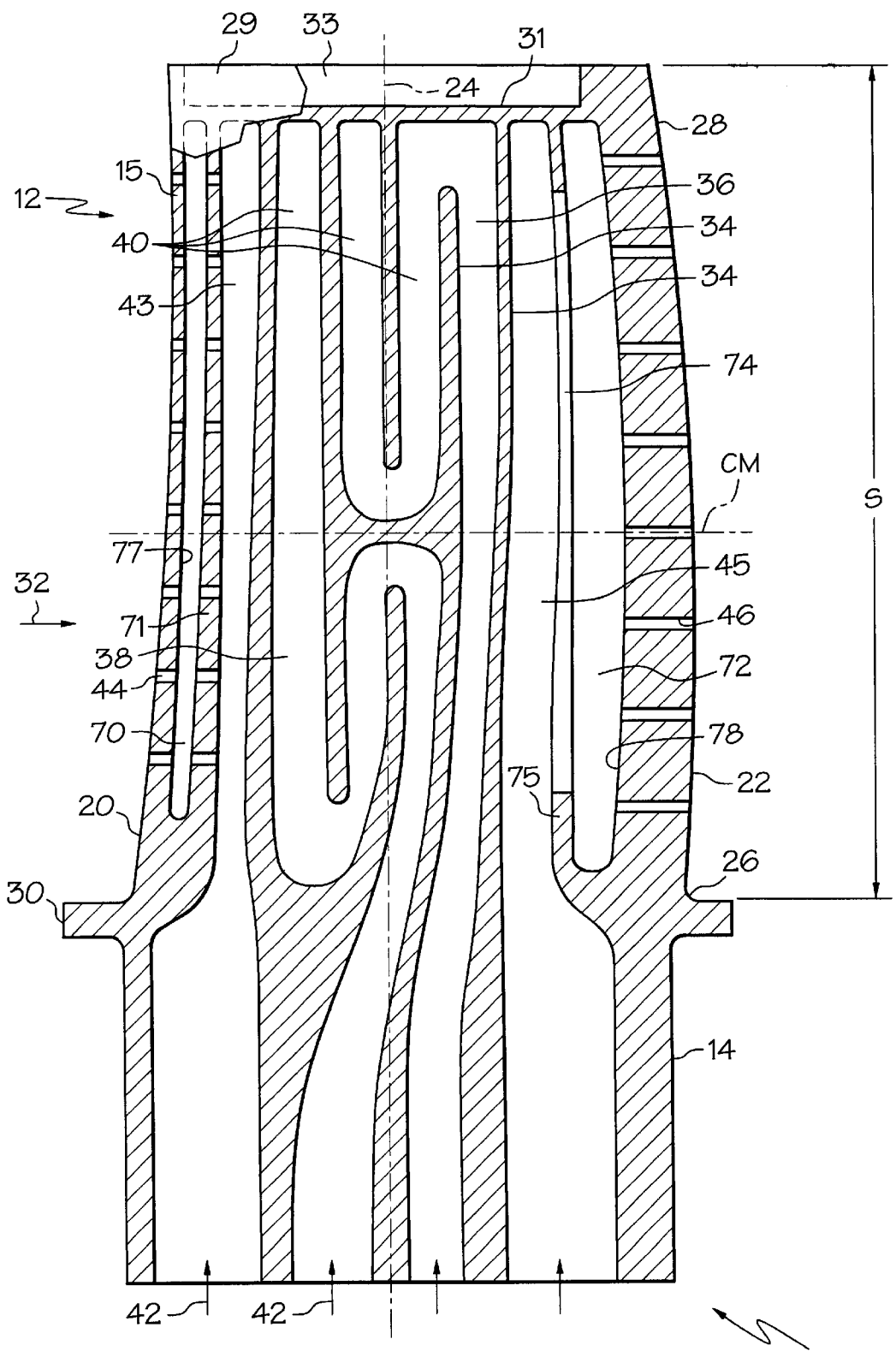
FIG. 5 is a sectional view illustration of a first alternative coolable airfoil including slotted impingement cooling of a trailing edge of the airfoil.

An alternative embodiment illustrated in FIG. 5, provides the slotted cooling air impingement means illustrated as the single longitudinally extending slot 74 in the aftwardmost span rib 75 which feeds cooling air from the aft inlet channel 45 to the trailing edge cooling plenum 72 and impinges the cooling air on an aft interior surface 78 of the trailing edge 22 for impingement cooling of the trailing edge. After the cooling air has been used for impingement cooling of the trailing edge 22, it is flowed through the trailing edge cooling holes 46 to cool the trailing edge 22. The embodiment in FIG. 5 provides conventional apertures 73 in the forwardmost span rib or the cold wall 71 which feed the cooling air from a forward inlet channel 43 to the leading edge cooling plenum 70 and impinges the cooling air on the forward interior surface 77 of the leading edge 20 for impingement cooling of the leading edge.

Figure 6:
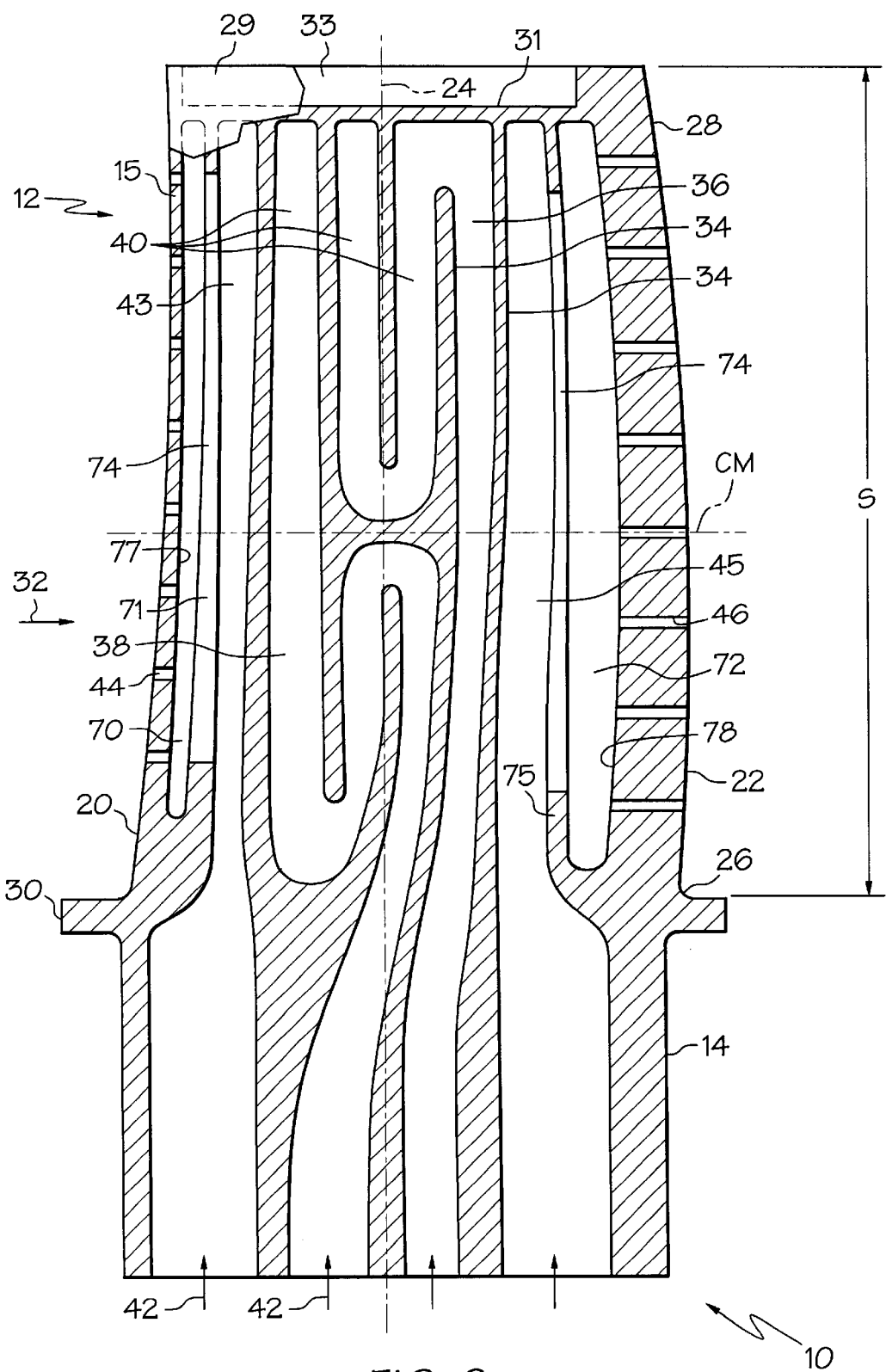
FIG. 6 is a sectional view illustration of a second alternative coolable airfoil including slotted impingement cooling of the leading and trailing edges of the airfoil.

FIG. 6 illustrates an embodiment of the invention which provides the slotted cooling air impingement means illustrated as the single longitudinally extending slot 74 in the forwardmost and aftwardmost span ribs 71 and 75, respectively. Alternative embodiments of the invention illustrated in FIGS. 5 and 6 employ the multiple slots 74, such as the three slots 74 shown in FIG. 4, preferably including the rounded slot ends 79. Two or more of the multiple slots 74 may be used.

Although the invention has been described with respect to the exemplary turbine blade 10 illustrated in the FIGS., it may also be used for turbine nozzle vanes which have similar airfoils which can benefit from preferential spanwise cooling thereof for better matching the radial applied temperature distribution from the combustion gases.

The multi-tier serpentine cooling arrangement described above has three-pass inner and outer serpentine circuits; however, other types of cooling circuits may be used in the present invention. The airfoil of the present invention may be readily manufactured using conventional casting techniques as are used for conventional multi-pass serpentine passages or circuits.

While there have been described herein what are considered to be preferred and exemplary embodiments of the present invention, other modifications of the invention shall be apparent to those skilled in the art from the teachings herein, and, it is therefore desired to be secured in the appended claims, all such modifications as fall within the true spirit and scope of the invention.

We claim:

1. A coolable gas turbine engine airfoil, said airfoil comprising:

an outer airfoil wall with pressure and suction sides extending chordwise between leading and trailing edges of said airfoil, a cooling plenum formed between a span rib and said outer wall and extending along at least one of said leading and trailing edges, leading edge shower head cooling holes extending through said leading edge to said plenum, a cooling air channel within said airfoil bounded in part by said span rib, a slotted cooling air impingement means in said span rib for impinging cooling air from said channel on an interior surface of said outer airfoil wall along said one of said leading and trailing edges, said slotted cooling air impingement means comprising two or more closely spaced apart longitudinally extending slots extending along almost an entire length of said span rib wherein said slots have slot lengths that are at least about an order of magnitude larger than slot widths of said slots and said slot widths being constant along said slot lengths.

2. An airfoil as claimed in claim 1 wherein each of said longitudinally extending slots has longitudinally spaced apart rounded ends.

3. A coolable gas turbine engine airfoil, said airfoil comprising:

an outer airfoil wall with pressure and suction sides extending chordwise between leading and trailing edges of said airfoil, a leading edge cooling plenum formed between a forwardmost span rib and said outer wall along said leading edge of said airfoil, leading edge shower head cooling holes extending through said leading edge to said plenum, a cooling air channel within said airfoil bounded in part by said forwardmost rib, a slotted cooling air impingement means in said span rib for impinging cooling air from said channel on an interior surface of said outer airfoil wall along said leading edge of said airfoil, and said slotted cooling air impingement means comprising two or more closely spaced apart longitudinally extending slots extending along almost an entire length of said forwardmost rib wherein said slots have slot lengths that are at least about an order of magnitude larger than slot widths of said slots and said slot widths being constant along said slot lengths.

4. An airfoil as claimed in claim 3 wherein each of said longitudinally extending slots has longitudinally spaced apart rounded ends.

5. A coolable gas turbine engine turbine blade comprising:

a coolable airfoil extending longitudinally outwardly from a platform of said blade to an outer airfoil tip;

a root extending longitudinally inwardly from said platform;

said airfoil comprising:

an outer airfoil wall with pressure and suction sides extending chordwise between leading and trailing edges of said airfoil, a leading edge cooling plenum formed between a forwardmost span rib and said outer wall along said leading edge of said airfoil, leading edge shower head cooling holes extending through said leading edge to said leading edge plenum.

a cooling air channel within said airfoil bounded in part by said forwardmost span rib, a first slotted cooling air impingement means in said forwardmost span rib for impinging cooling air from said channel on a forward interior surface of said outer airfoil wall along said leading edge of said airfoil, and said first slotted cooling air impingement means comprising two or more closely spaced apart longitudinally extending first slots extending along almost an entire length of said forwardmost span rib wherein said first slots have first slot lengths that are at least about an order of magnitude larger than first slot widths of said first slots and said first slot widths being constant along said first slot lengths.

6. A blade as claimed in claim 5 wherein each of said longitudinally extending first slots has longitudinally spaced apart rounded ends.

7. A blade as claimed in claim 5 wherein said coolable airfoil further comprises;

a trailing edge cooling plenum formed between an aftwardmost span rib and said outer wall along said trailing edge of said airfoil, trailing edge cooling holes extending through said trailing edge to said trailing edge cooling plenum, an aft cooling air channel within said airfoil bounded in part by said aftwardmost rib, a second slotted cooling air impingement means in said aftwardmost span rib for impinging cooling air from said channel on an aft interior surface of said outer airfoil wall along said trailing edge of said airfoil, and wherein said second slotted cooling air impingement means includes at least one longitudinally extending narrow second slot having a second slot length that is at least about an order of magnitude larger than a second slot width of said narrow second slot and said second slot width being constant along said second slot length.

8. A blade as claimed in claim 7 wherein said second slotted cooling air impingement means comprises a single one of said longitudinally extending slot extending along almost an entire length of each of said forward and aftwardmost span ribs.

9. A blade as claimed in claim 8 wherein said single longitudinally extending slot has longitudinally spaced apart rounded ends.

10. A blade as claimed in claim 7 wherein said second slotted cooling air impingement means comprises two or more closely spaced apart longitudinally extending second slots extending along almost an entire length of said aftwardmost span rib wherein said second slots have second slot lengths that are at least about an order of magnitude larger than second slot widths of said second slots and said second slot widths being constant along said second slot lengths.

11. A blade as claimed in claim 10 wherein each of said longitudinally extending slots has longitudinally spaced apart rounded ends.

\* \* \* \* \*